Dec. 29, 1942.  K. FISCHER  2,306,940
FLOW METER
Filed Oct. 22, 1941
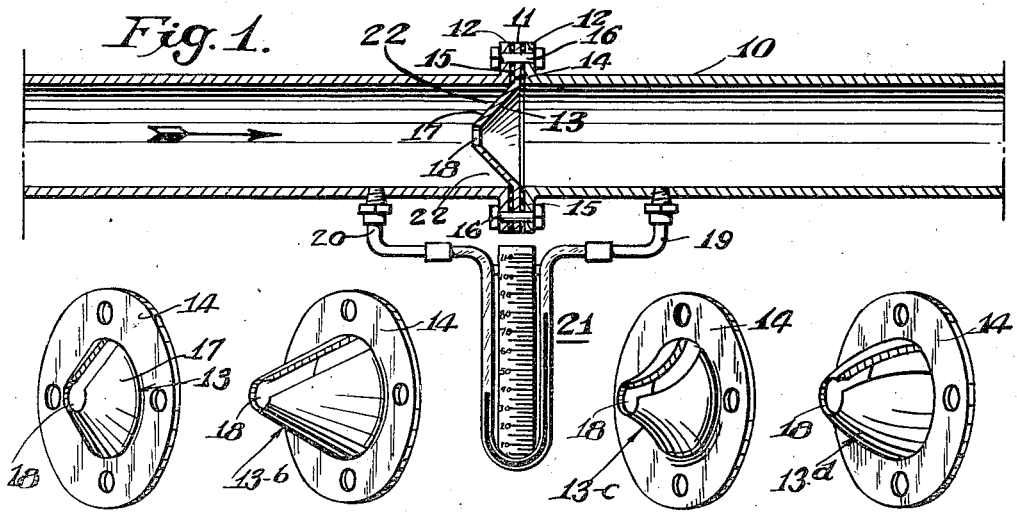
Fig.1.
Fig.3.  Fig.4.  Fig.5.  Fig.6.
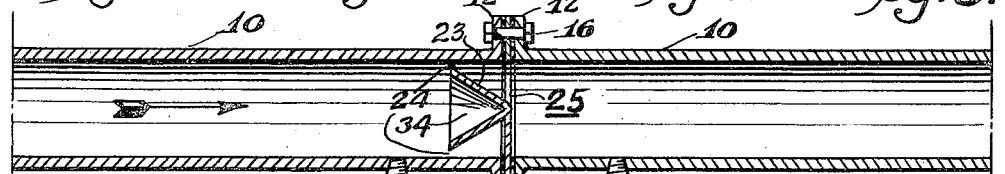
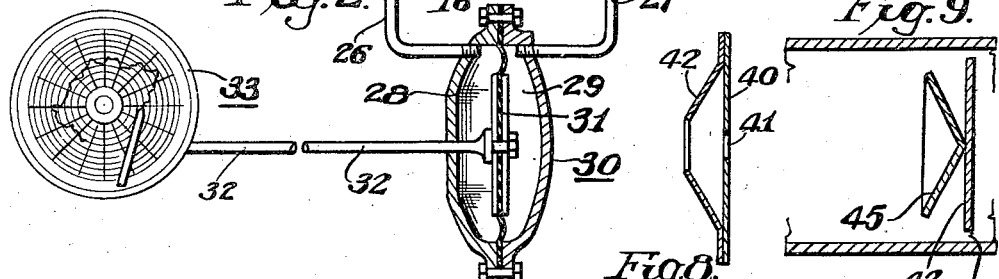
Fig.2.  Fig.9.
Fig.8.
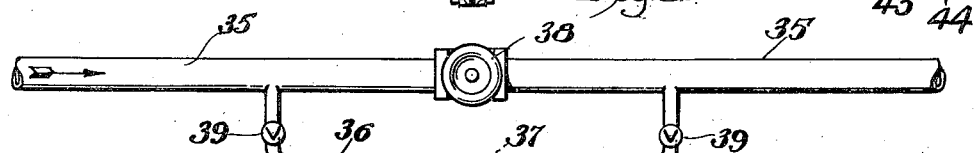
Fig.7.
INVENTOR.
Kermit Fischer
BY Leonard L. Kalish Patented Dec. 29, 1942

2,306,940

UNITED STATES PATENT OFFICE 2,306,940

FLOW METER

Kermit Fischer, Bridge Valley, Pa., assignor to Fischer & Porter Company, Hatboro, Pa., a corporation of Pennsylvania Application October 22, 1941, Serial No. 416,045

8 Claims. (Cl. 73—211)

The present invention relates to flow meters and it relates more particularly to rate-of-flow indicating orifice meters.

An object of the present invention is to provide a more accurate and dependable orifice meter.

Another object of the present invention is to provide a flow-constricting orifice of a certain new and useful construction, the drop in pressure across which will indicate accurately the rate-of-flow of fluid.

Still another object of the present invention is to provide a flow-indicating orifice meter which will be generally unaffected by and independent of variations in viscosity of the fluid being metered.

With the above and other objects in view as will appear more clearly from the following specification and appended claims and accompanying drawing, the present invention contemplates a certain new and useful flow-constricting orifice in which the viscosity effect of the fluid being metered is reduced to a point at which it becomes negligible and, in fact, may be reduced to zero.

As is well known in the art, the drop in pressure across a flow-constricting orifice is a measure of the rate-of-flow of the fluid;—the drop in pressure varying with the rate-of-flow according to definite and well-established laws.

However, in the use of old-type orifices, one serious difficulty was the fact that the drop in pressure was affected by changes in the viscosity of the fluid being metered. Thus, the reading given by a conventional orifice could not accurately be translated into terms of rate-of-flow of fluid unless and until the viscosity of the fluid were determined and a suitable correction factor applied for each particular fluid. It can readily be seen that this involved a considerable amount of extra work and calculation as well as the necessity for taking additional measurements which otherwise would not be necessary.

I have found that by employing a flow-constricting orifice which is in the form of a cup or pocket or concavity facing generally in the direction of the on-coming fluid, it is possible to obtain measurements of the rate-of-flow of the fluid which are more accurate and which are generally independent of and unaffected by changes in the viscosity of the fluid.

For the purpose of illustrating the invention, there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a diagrammatic cross-sectional view of one embodiment of the present invention.

Figure 2 represents a diagrammatic cross-sectional view of another embodiment of the present invention.

Figure 3 represents a perspective view on a somewhat enlarged scale of another flow-constricting plate which may be used instead of the plate shown in Figure 1.

Figure 4 represents still another modification of a flow-constricting plate.

Figure 5 represents another form of flow-constricting plate which has a generally convex curvilinear taper.

Figure 6 represents a flow-constricting plate which has a generally concave curvilinear taper.

Figure 7 represents a schematic view of one possible by-pass piping arrangement which may be used.

Figure 8 represents a diagrammatic view of another embodiment of the present invention having a central flow-constricting orifice.

Figure 9 represents a diagrammatic view of another embodiment of the present invention somewhat similar to that of Figure 8 but employing an annular orifice.

Referring to the embodiment shown in Figure 1, I may provide a conduit indicated generally by the numeral 10. Conduit 10 may be of any conventional construction and may be formed of tubing or pipe sections or the like arranged in fluid-tight sealing relationship, through which the fluid, either gas or liquid, is to be passed. The conduit 10 may be formed of suitable material of appropriate physical and chemical properties depending upon the nature and character of the fluid being metered. Thus, if the fluid is corrosive or has other special properties, the conduit 10 should be constructed of material which is resistant to and which will not be attacked by the fluid.

At any convenient point in the conduit 10, I may provide a joint 11 formed by opposed flanges 12.

A flow-constricting plate indicated by the numeral 13 is disposed within the conduit 10 with its outer peripheral edge 14 intermediate the opposed flanges 12. Suitable gaskets 15 may be positioned intermediate the flanges 12 and the peripheral edge 14. A plurality of bolts 16 may extend through registering openings in the flanges 12, the peripheral edge 14 of the plate 13 and the gaskets 15 to hold the joint 11 in fluid-tight sealing relationship.

The flow-constricting plate 13 is provided with a tapered portion 17 extending radially inwardly from the peripheral edge 14 and facing in the direction of the on-coming fluid. A central orifice 18 is provided in the flow-constricting plate 13; said orifice being positioned on the "up-stream" side of the joint 11.

By reason of this construction a generally annular concavity or pocket 22 is provided around the orifice 18 on the "up-stream" side of the flow-constricting plate 13.

A pipe 20 may lead from the conduit 10 on the "up-stream" side of the flow-constricting plate 13 and a similar pipe 19 may lead from the conduit 10 on the "down-stream" side of the plate 13. Pipes 19 and 20 may lead to the two arms of a manometer 21 of conventional construction; the difference in height of liquid in the two arms of the manometer 21 being a measure of the difference in pressure on the two sides of the orifice 18.

In place of the manometer 21 shown in Figure 1, any conventional form of pressure-differential measuring device may be used.

When rate-of-flow of fluid is measured by an orifice-type meter of conventional construction employing an orifice plate which is either flat and perpendicular to the direction of flow or which is inclined away from the direction of flow to form an acute angle therewith (as for example Venturi-type orifice meters) there may be stream-lined flow both before and after the orifice at low flow rates. As the rate-of-flow becomes somewhat higher, turbulence sets in; turbulence occurring first at the "down-stream" side of the orifice and, as the rate-of-flow becomes still higher, subsequently at the "up-stream" side of the orifice, as well.

The degree of turbulence of a fluid passing through an orifice is also affected by the viscosity of the fluid except where the turbulence is already at a maximum as the result of the passage of fluid through the constricting orifice. In old-type orifice meters of the conventional construction hereinabove described, this point of maximum turbulence is attained only at maximum rate-of-flow; that is, at the maximum capacity of the orifice. Thus, at any rate-of-flow above the stream-lined rate and below the maximum rate, a conventional orifice will produce a turbulence which is affected by the viscosity of the fluid so that, at the same rate-of-flow, fluids of different viscosity will give different degrees of turbulence and, as a result, will give different readings on a device measuring the differential pressure across the orifice.

I have found that my novel orifice construction in which a pocket or concavity is formed adjacent the orifice, on the "up-stream" side thereof, produces the greatest possible amount of turbulence at low as well as at high rates-of-flow. That is, the amount of turbulence created by my novel construction remains much more nearly uniform regardless of the rate-of-flow and regardless of how turbulent or how stream-lined the approaching body of fluid may be.

As a result, the turbulence is maintained more or less approximately at its maximum regardless of the rate-of-flow and, therefore, the effect of viscosity variations upon the turbulence and upon the pressure-drop is minimized.

While the above theory appears to me to be the correct explanation of the functioning of my novel orifice construction in producing rate-of-flow readings which are more accurate and which are more or less independent of viscosity variations, it is advanced without, in any way, limiting or affecting the scope or nature of the present invention.

The angle of taper of the portion 17 of the flow-constricting plate 13 may be varied through relatively wide limits. Thus, under certain conditions, it may be desirable to employ only a very slight degree of taper so that the plate might be said to resemble a "Japanese parasol" with an opening at its peak; as for example, plate 13—a shown in Figure 3.

On the other hand, under certain conditions, it may be desirable to employ a plate having a relatively steep angle of taper; as for example, the plate 13—b shown in Figure 4.

I have found that by providing a suitable angle of taper upon the flow-constricting plate, it is possible to reduce the viscosity effect to zero.

Many other modifications of the plate construction are possible. Thus, the plate, instead of having a flat conical taper, as shown in Figure 1, may have a curvilinear taper; as for example plates 13—c and 13—d as shown in Figures 5 and 6 respectively. It is also possible to employ plates having two or more different tapers; the only limitation being that the flow-constricting plate is so inclined as to place its orifice at the "up-stream" edge thereof.

In Figure 2 I have shown another modification of my present invention in which a flow-constricting plate is employed which gives an annular orifice. Thus, in Figure 2 I may provide a flow-constricting plate 23 which is inclined or tapered in the direction of the on-coming fluid and which terminates short of the walls of the conduit 10 to provide an annular clearance or orifice 24 between the walls of the conduit 10 and the plate 23. The flow-constricting plate 23 is maintained in position by means of a spider 25 which may be affixed thereto at the closed tip thereof or at any other point on the down-stream side of the orifice. The spider 25 may have a plurality of arms extending radially outwardly with their outermost ends held between the flanges 12 of the joint 11. The arms of the spider 25 are made relatively thin so that they do not interfere with the flow of fluid.

A pipe 26 leads from the conduit 10 at the "up-stream" side of the orifice 24 while a similar pipe 27 leads from the conduit 10 on the "down-stream" side of the orifice 24.

For purposes of illustration, the pipes 26 and 27 are shown as leading to a pressure-differential measuring device which may be used as an alternative to the manometer 21 shown in Figure 1. Thus, in Figure 2 the pipes 26 and 27 lead to the high- and low-pressure compartments 28 and 29 of a pressure-differential indicating device 30; compartments 28 and 29 being separated by a flexible diaphragm 31 which is adapted to be displaced according to variations in pressure in the compartments 28 and 29. A suitable shaft 32 has one end affixed to the diaphragm 31 and is adapted to be moved axially by movements of the diaphragm. The other end of the shaft 32 extends outward from the device 30 and may be connected to any suitable means (not shown) for amplifying its movement and to any suitable conventional mechanism 33 for indicating and recording it.

The device 30, after it has been suitably calibrated will indicate, upon the recording mechanism 33, the variations in the pressure-differential on the "up-stream" and "down-stream" sides of the orifice 24.

As described hereinabove with respect to the embodiment shown in Figure 1, the tapered flow-constricting plate 23 forms a fluid-entrapping turbulence-creating pocket 34 on the "up-stream" side thereof. The pocket 34 functions in generally the same way as described hereinabove with respect to pocket 22 to eliminate the effect of viscosity changes upon the pressure drop across the orifice 24. Thus, the construction shown in Figure 2 will give rate-of-flow readings which are independent of and unaffected by changes of viscosity of the fluid being metered.

Just as the flow-constricting plate 13 shown in Figure 1 may be modified as hereinabove described, the plate 23 of Figure 2 may similarly be modified without departing from the spirit of the present invention. Thus, the plate 23 could be made with varying angles of taper, or the plate could be made with a curvilinear as distinguished from a conical taper, or the plate could be given two or more different angles of taper; the only requirement being that the flow-constricting plate 23 be inclined in the direction of the on-coming fluid so that the annular orifice 24 is at the "up-stream" edge thereof and so that a pocket or concavity facing in the direction of the on-coming fluid is formed adjacent the orifice 24.

While one piping arrangement has been described hereinabove in detail, the invention is not limited to the details of construction described. Thus, other piping arrangements could be employed. For example, the flow-constricting orifice of the present invention could be disposed within a by-pass line rather than in the main line of fluid flow so that, with suitable calculation, the rate-of-flow of the fluid could be determined without reducing the capacity of the pipe line. Such a piping arrangement is illustrated schematically in Figure 7 in which are shown a main line 35 and a by-pass line 36 in which a fluid-entrapping turbulence-creating orifice plate 37 is disposed. A conventional manometer is operatively connected to the by-pass line 36 to measure the drop in fluid-pressure across the orifice plate 37. A valve 38 is provided in the main line 35 intermediate the ends of the by-pass line 36. Valves 39 are provided at either end of the by-pass line 36. If valves 38 and 39 are all fully opened, fluid will flow through the lines 35 and 36 according to their respective capacities; the drop in pressure across the orifice plate 37 being a measure of the rate-of-flow of fluid. If valve 38 is open and valves 39 are closed, the by-pass line 36 and the orifice are cut off; the fluid-flow being confined to the main line 35. If valve 38 is closed and valves 39 are open, the entire fluid-flow will be directed through the by-pass line 36. Many other piping arrangements are possible and are contemplated.

While the drawing shows the novel orifice plate of the present invention as held within the conduit by means of the flanged pipe joint 11, this is for purposes of illustration only; other means for connecting the orifice plate within the conduit being possible and being contemplated.

While I prefer to form the turbulence-creating fluid-entrapping pocket as an integral part of the flow-constricting plate as shown in Figures 1 and 2 by inclining the plate in the direction of the on-coming fluid, my invention is not limited to this integral construction. My invention contemplates the use of separate turbulence-creating means on the "up-stream" side of the orifice.

Thus, in Figure 8 I have shown, diagrammatically, a flat orifice plate 40 of conventional construction having a central flow-constricting orifice 41, on the "up-stream" side of which is affixed a frusto-conical plate 42 which functions to provide a fluid-entrapping turbulence-creating pocket adjacent the "up-stream" side of the orifice 41. While the frusto-conical plate 42 is shown as being affixed to the flow-constricting plate 40, it is possible to support the plate 42 in any other manner within the conduit.

In Figure 9 I have shown a flat flow-constricting plate 43 of conventional construction providing an annular flow-constricting orifice 44. A separate conical plate 45 is provided adjacent the "up-stream" side of the flat flow-constricting plate 43 and functions to create a fluid-entrapping turbulence-creating pocket adjacent the "up-stream" side of the orifice 44.

My invention contemplates the use of any turbulence-creating member adjacent the "up-stream" side of the flow-constricting orifice and is not limited to the illustrative embodiments herein shown and described.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

The invention having thus been described, what is hereby claimed to be new and desired to be secured by Letters Patent is:

1. A flow meter generally unaffected by and independent of viscosity variations of fluid being metered comprising a conduit, a flow-constricting barrier disposed within said conduit and providing an orifice of relatively small cross-sectional area for the passage of fluid, said barrier having an inclined face on its up-stream side, said face being inclined in the direction of the on-coming fluid and forming a fluid-entrapping pocket on the up-stream side of said barrier thereby to produce turbulent flow through said orifice, and means operatively connected to said conduit up-stream and down-stream of said orifice for determining the drop in fluid-pressure thereacross.

2. A flow meter comprising a conduit, a fluid-tight joint formed in said conduit, a flow-constricting plate disposed within said conduit, means for supporting said plate from said joint, said flow-constricting plate providing an orifice of relatively small cross-sectional area for the passage of fluid, said plate being inclined in the direction of the on-coming fluid and forming a fluid-entrapping turbulence-creating cup-like pocket on the up-stream side of said plate, and means for determining the differential-pressure of fluid across said orifice.

3. A flow meter comprising a conduit, a flow-constricting plate disposed within said conduit and providing an orifice of relatively small cross-sectional area for the passage of fluid, said plate being inclined in the direction of the on-coming fluid and forming a fluid-entrapping turbulence-creating pocket on the up-stream side of said plate, and means for determining the drop in fluid-pressure across said orifice.

4. A flow meter comprising a flow-constricting plate disposed within the path of fluid flow and providing a relatively small generally central orifice for passage of fluid, said plate being inclined in the direction of the oncoming fluid with the orifice at the up-stream edge of said plate, said plate providing an annular pocket-like concavity on the up-stream side thereof generally adjacent and peripheral to said orifice, and means for determining the drop in fluid-pressure across said orifice.

5. A meter for determining rate-of-flow of fluid comprising a flow-constricting barrier disposed within the path of fluid flow and providing an annular orifice of relatively small cross-sectional area for the passage of fluid, said barrier having its up-stream face inclined in the direction of the on-coming fluid with the orifice at the up-stream edge thereof, thereby forming a pocket-like concavity adjacent to said orifice on the up-stream side of said barrier, said concavity producing turbulent flow through said orifice, and means for determining the drop in fluid-pressure across said orifice.

6. A flow meter comprising a conduit, a flow-constricting plate disposed within said conduit and providing an orifice of relatively small cross-sectional area for the passage of fluid, said plate being generally conical with the orifice at the up-stream edge thereof, and providing a fluid-entrapping turbulence-creating pocket on the up-stream side of said plate, and means for determining the drop in fluid-pressure across said orifice.

7. A flow meter comprising a conduit, a flow-constricting plate disposed within said conduit and providing an orifice of relatively small cross-sectional area for the passage of fluid, said plate having a generally curvilinear taper with the orifice at the up-stream edge thereof, and providing a fluid-entrapping turbulence-creating pocket on the up-stream side of said plate, and means for determining the drop in fluid-pressure across said orifice.

8. A flow meter comprising a flow-constricting plate disposed within the path of fluid flow and providing an orifice of relatively small cross-sectional area for passage of fluid, turbulence-creating means adjacent the up-stream side of said orifice, and means for determining the drop in fluid-pressure across said orifice.

KERMIT FISCHER.